United States Patent
Ziegler et al.

(10) Patent No.: US 7,618,714 B2
(45) Date of Patent: Nov. 17, 2009

(54) COMPOSITE BODY MADE FROM POLYACETAL, BONDING AGENT AND POLYOLEFIN, METHOD FOR PRODUCTION AND USE THEREOF

(75) Inventors: Ursula Ziegler, Mainz (DE); Klaus Kurz, Kelsterbach (DE); Frank Reil, Seeheim-Jugenheim (DE)

(73) Assignee: Ticona GmbH (DE)

( * ) Notice: Subject to any disclaimer, the term of this patent is extended or adjusted under 35 U.S.C. 154(b) by 418 days.

(21) Appl. No.: 10/533,984

(22) PCT Filed: Nov. 3, 2003

(86) PCT No.: PCT/EP03/12210

§ 371 (c)(1),
(2), (4) Date: May 25, 2005

(87) PCT Pub. No.: WO2004/041531

PCT Pub. Date: May 21, 2004

(65) Prior Publication Data

US 2006/0040120 A1 Feb. 23, 2006

(30) Foreign Application Priority Data

Nov. 5, 2002 (DE) ................. 102 51 333

(51) Int. Cl.
*B32B 27/08* (2006.01)
*B32B 27/30* (2006.01)
*B32B 27/32* (2006.01)
(52) U.S. Cl. .................. 428/501; 428/520; 428/522
(58) Field of Classification Search .......... 428/501, 428/520, 522
See application file for complete search history.

(56) References Cited

U.S. PATENT DOCUMENTS

| | | | |
|---|---|---|---|
| 4,087,588 A | 5/1978 | Shida et al. | |
| 4,906,690 A | 3/1990 | Hasenbein et al. | |
| 5,115,033 A | 5/1992 | Wong | |

FOREIGN PATENT DOCUMENTS

| | | |
|---|---|---|
| DE | 27 44 528 | 12/1978 |
| EP | 0 323 650 | 7/1989 |
| EP | 0 463 841 | 1/1992 |
| JP | 55-079233 | 6/1980 |
| JP | 09-248851 | 9/1997 |
| JP | 11-091040 | 4/1999 |
| WO | WO-98/29245 | 7/1998 |

OTHER PUBLICATIONS

MatWeb.com, The Online Materials Database: Overview EVA, Adhesive/sealant Grade (http://www.matweb.com).

*Primary Examiner*—D. S Nakarani
(74) *Attorney, Agent, or Firm*—Connolly Bove Lodge & Hutz LLP

(57) ABSTRACT

Composite products are described and encompass at least one polyacetal molding and at least one polyolefin molding, which have been bonded at at least one of their surfaces using an adhesion-promoting layer which is substantially composed of a copolymer or of a mixture of these which derives from at least one alpha-olefin and from at least one ethylenically unsaturated carboxylic acid, and/or from at least one ethylenically unsaturated carboxylic acid derivative, where the molar ratio of alpha-olefin to ethylenically unsaturated carboxylic acid and/or to ethylenically unsaturated carboxylic acid derivative is selected so as to obtain composites with a bond strength (measured by the tensile test at 23° C.) of at least 0.2 N/mm².

The composite products described can in particular be used for producing components which come into contact with fuels.

17 Claims, No Drawings

COMPOSITE BODY MADE FROM POLYACETAL, BONDING AGENT AND POLYOLEFIN, METHOD FOR PRODUCTION AND USE THEREOF

RELATED APPLICATIONS

This application is a national stage application (under 35 U.S.C. 371) of PCT/EP2003/012210 filed Nov. 3, 2003 which claims benefit to German application 102 51 333.3 filed Nov. 5, 2002.

The invention relates to a composite product composed of polyacetal and polyolefin, and bonded by a selected adhesion promoter.

Polyacetal is an engineering material which is typically polyoxymethylene homo- or copolymer (also termed "POM" below), and has excellent mechanical properties, and is moreover generally also resistant to conventional solvents and fuels.

Polyacetal's good strength and hardness, combined with excellent rebound resilience, are the reasons for very frequent application of polyacetal moldings for snap connectors, in particular clips, in all fields of everyday life.

POM's excellent sliding friction properties are the reason for its use in many movable parts, such as gearbox components, deflector rollers, gears, or adjustment levers.

A wide variety of housings and keyboards are produced from the POM, because it has very good mechanical strength and resistance to chemicals.

POM moldings are therefore also very frequently used in automotive construction. The combination of excellent mechanical properties with high resistance to fuels makes the material ideal for the entire fuel sector, e.g. for gasoline pumps or tank sensors.

On the other hand, polyolefins, such as polyethylene or polypropylene, are frequently used for large components and for protective containers and packaging, because these materials have high toughness and are inexpensive.

By way of example, polyethylene is used in automotive construction as a material for fuel tanks. In the packaging sector, polyethylene and polypropylene are used, by way of example, as weldable foil materials or as a material for bottles or other containers.

However, when polyolefins, such as polyethylene or polypropylene, are compared with polyacetal they have markedly poorer mechanical properties, such as strength, hardness, and in particular rebound resilience.

Polyolefins also have the disadvantage of high swell and of high permeation rate for non-polar solvents, e.g. for hydrocarbons, and in particular fuels in the automotive sector. For use in the tank sector, polyethylene is therefore sometimes fluorinated by a complicated process in order to reduce permeability for hydrocarbons.

It would therefore be desirable to combine the particular properties of polyacetal and of polyolefins. In a composite product, the polyacetal could assume the mechanical functions of, by way of example, snap connectors, gearbox components, deflector rollers, gears, or adjustment levers, while the tough and less expensive polyolefin, in particular polyethylene, could be used for large-volume components. Because polyacetals have particular fuel resistance, particular mention should also be made here of components which are used in contact with fuels.

As a consequence of increasingly stringent vapor emission requirements in some states of the USA (e.g. California, New York, Vermont) in relation to vehicle fuel systems (Low Emission Vehicle LEV II), and also p-ZEV (partial Zero Emission Vehicle), many modules within the fuel system are having to be redesigned with plastics having greater permeation resistance. Specifically, techniques for bonding and sealing on plastics fuel tanks and on fuel lines are having to be re-engineered with a view to the reduction in vapor emissions. Alongside a reduction in the extent of openings needed on the tank, the openings retained are to be engineered to be absolutely leakproof. The inventive method permits, by way of example, permeation-proof bonding of the POM flange intended to receive the fuel transport unit to the blown PE tank body.

It is therefore important in these applications that there is sufficient adhesion between the polyacetal component and the polyolefin component. This requirement has hitherto proven impossible to implement because these two types of polymer are known to be incompatible.

Another way of producing bonds consists in coextrusion of polyolefins with other more polar plastics which have better chemical resistance to the non-polar solvents or fuels mentioned. By way of example, this process can be used to draw foils or to produce multilayer containers by coextrusion blow molding. This requires adhesion promoters which permit adhesive bonding between polyolefin and this more polar plastic. However, combinations of this type with polyolefins have hitherto been disclosed merely with selected polymers, such as polyamides, polyesters, or polyvinyl alcohol. There has hitherto been no description of composites of polyacetals and polyolefins with adequate adhesion.

The adhesion promoters used in the previously disclosed composites of polyolefins with polyamides, polyesters, or polyvinyl alcohol comprise polyolefins which have been grafted with acids or with anhydrides and which react with the polar plastic by way of the acid function, form a chemical bond, and thus permit adhesive bonding. Examples of composites of this type have been disclosed in EP-A-463,841, U.S. Pat. No. 5,115,033, EP-A-323,650, and DE-A-2,744,528.

Starting from this prior art, it is an object of the present invention to provide a composite product which is composed of polyolefin and polyacetal and has adequate chemical adhesion between the two materials, and combines the particular advantages of the two materials.

Another object of the present invention is to provide a composite product composed of polyacetal and polyolefin.

Surprisingly, it has been found that selected adhesion promoters enter into adhesive bonding not only with polyacetal but also with polyolefins and therefore permit production of composites from these materials.

The present invention therefore provides a composite product encompassing at least one polyacetal molding and at least one polyolefin molding, which have been bonded at at least one of their surfaces using an adhesion-promoting layer which is substantially composed of a copolymer or of a mixture of these which derives from at least one alpha-olefin and from at least one ethylenically unsaturated carboxylic acid, and/or from at least one ethylenically unsaturated carboxylic acid derivative, where the molar ratio of alpha-olefin to ethylenically unsaturated carboxylic acid and/or to ethylenically unsaturated carboxylic acid derivative is selected so as to obtain composites with a bond strength (measured by the tensile test at 23° C. as described below) of at least 0.2 N/mm$^2$, preferably at least 0.5 N/mm$^2$.

Moldings composed of polyacetals are used in the inventive composite products. These are usually polyoxymethylene homo- or copolymers.

The polyoxymethylenes (POMs), for example those described in DE-A 29 47 490, are generally unbranched linear polymers which generally contain at least 80%, preferably at least 90%, of oxymethylene units (—CH$_2$O—). The term polyoxymethylenes here encompasses homopolymers of formaldehyde or of its cyclic oligomers, such as trioxane or tetroxane, and also appropriate copolymers.

Homopolymers of formaldehyde or of trioxane are polymers whose hydroxy end groups have been chemically stabilized in a known manner with respect to degradation, e.g. by esterification or etherification.

Copolymers are polymers of formaldehyde or of its cyclic oligomers, in particular trioxane, with cyclic ethers, with cyclic acetals, and/or with linear polyacetals.

POM-homo- or copolymers are known per se to the skilled worker and have been described in the literature.

Very generally, these polymers have at least 50 mol % of —CH$_2$O— repeat units in the main polymer chain.

The homopolymers are generally prepared by polymerizing formaldehyde or trioxane, preferably in the presence of suitable catalysts.

POM copolymers particularly preferred in the inventive composite products are those which besides the —CH$_2$O— repeat units also contain up to 50 mol %, preferably from 0.1 to 20 mol %, and in particular from 0.5 to 10 mol %, of

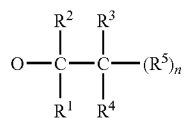

repeat units, where $R^1$ to $R^4$, independently of one another, are a hydrogen atom, a $C_1$-$C_4$-alkyl group, or a halogen-substituted alkyl group having from 1 to 4 carbon atoms, and $R^5$ is —CH$_2$—, —CH$_2$O—, a $C_1$-$C_4$-alkyl-substituted or $C_1$-$C_4$-haloalkyl-substituted methylene group, or a corresponding oxymethylene group, and n is a value in the range from 0 to 3.

These groups may advantageously be introduced into the copolymers via ring-opening of cyclic ethers. Preferred cyclic ethers are those of the formula

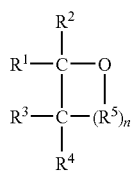

where $R^1$ to $R^5$ and n are as defined above.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also linear oligo- or polyformals, such as polydioxolane or polydioxepan as comonomers.

Copolymers of from 99.5 to 95 mol % of trioxane and from 0.5 to 5 mol % of one of the abovementioned comonomers are particularly advantageously used.

Other suitable polyoxymethylenes are oxymethylene terpolymers which are prepared, by way of example, via reaction of trioxane and of one of the cyclic ethers described above with a third monomer, preferably with a bifunctional compound of the formula

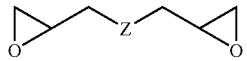

where Z is a chemical bond, —O—, or —O—$R^6$—O— ($R^6$=$C_2$-$C_8$-alkylene or $C_2$-$C_8$-cycloalkylene).

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, e.g. the diglycidyl ethers of ethylene glycol, 1,4-butanediol, 1,3-butanediol, 1,3-cyclobutanediol, 1,2-propanediol, or 1,4-cyclohexanediol, to mention just a few examples.

Processes for preparing the abovementioned POM homo- and copolymers are known to the person skilled in the art and are described in the literature.

POM copolymers whose use is preferred have melting points of at least 150° C. and molecular weights (weight-average) $M_w$ in the range from 5000 to 200 000, preferably from 7000 to 150 000.

It is particularly preferable to use end-group-stabilized POM polymers whose chain ends have C—C bonds.

The POM polymers used generally have a melt index (MVR value 190/2.16) of from 0.5 to 75 cm$^3$/10 min (ISO 1133).

Alongside these constituents, other additives known per se may be present in the polyacetal molding compositions for production of the inventive composite products.

Examples of these additives are processing aids, such as antioxidants, acid scavengers, formaldehyde scavengers, UV stabilizers, adhesion promoters, lubricants, nucleating agents, or mold-release agents; fillers, such as glass beads, calcium carbonate, talc, wollastonite, or silicon dioxide; reinforcing materials, such as carbon fibers, aramid fibers, or glass fibers; antistatic agents or other additives which give the molding composition a desired property, e.g. dyes and/or pigments, and/or impact modifiers, and/or additives promoting electrical conductivity, e.g. carbon black or metal particles, or else a mixture of these additives, but there is no intention to restrict the scope to the examples mentioned.

The proportion of these additives in the polyacetal molding compositions for production of the inventive composite products is usually up to 30% by weight, based on the entire formulation.

The inventive composite products use moldings composed of polyolefins. These are usually homo- or copolymers which derive from alpha-olefins or from mixtures of these, where the co-components used may also comprise mono-, bi-, or polycyclic olefins.

Examples of alpha-olefins are 1-butene, 1-pentene, 1-hexene, 1-octene, 1-propene, and in particular ethylene.

Examples of cyclic olefins are cyclohexene or norbornene.

Typical examples of polyolefins are polypropylene or polyethylene, or copolymers of propylene and/or of ethylene with very small proportions, for example up to 5 mol %, of higher alpha-olefins such as the above mentioned monomers.

It is preferable to use polypropylene and very particularly preferable to use polyethylene. For the purposes of this description, polyethylene means any of the known types of polyethylene, i.e. high-pressure and low-pressure polyethylene, and these may have been prepared in any desired manner, and with use of any desired catalysts.

Typical molecular weights of the polyolefins used in the inventive composite products are in the range up to $1*10^6$ g/mol (measured by viscometry). The method for determination of molecular weight by viscometry is described by way of example in CZ—Chemische Technik 4 (1974), 129.

The polyolefin molding compositions for production of the inventive composite materials may comprise conventional auxiliaries, conventional additives, conventional fillers, and conventional reinforcing agents, all of which ease processing or further processing, and/or give desired properties to the product of further processing.

Examples of additives are fillers and/or in particular reinforcing materials, e.g. dyes or organic or inorganic pigments, such as azo and diazo pigments, metal complex pigments, titanium dioxide, iron oxide, chromium oxide, ultramarine pigments, aluminum silicate pigments, or carbon black; antistatic agents, such as carbon black; reinforcing agents, such as fibers composed of a very wide variety of materials, such as glass, carbon, or metal; or mineral fillers, such as calcium carbonate, kaolin, clays, titanium dioxide, alumina trihydrate, wollastonite, talc, pyrophyllite, quartz, silicates, barium sulfate, antimony oxide, mica, calcium sulfate, magnesium hydroxide, or feldspar; synthetic fillers, such as carbon black, synthetic silicates, solid and hollow microspheres, glass-based additives, metallic additives, such as aluminum powder, iron powder, or silver powder, or magnetic additives.

Examples of other additives are antioxidants, and also processing aids, such as mold-release agents, lubricants, or adhesion promoters.

The proportion of these additives in the polyolefin molding compositions for production of the inventive composite products is usually up to 30% by weight, based on the entire formulation.

The polymers and copolymers which form the adhesion-promoting layer are known per se and have been previously described for other polymer combinations.

The adhesion-promoting polymers are copolymers which derive from at least one alpha-olefin and from at least one ethylenically unsaturated carboxylic acid, and/or from at least one ethylenically unsaturated carboxylic acid derivative.

When suitable adhesion promoters are selected from the group mentioned of the polyolefin copolymers, the selection of the formulation is to be such that the proportion of ethylenically unsaturated carboxylic acids and/or of ethylenically unsaturated carboxylic acid derivatives is high enough to achieve compatibility with the POM, but on the other hand not too high to achieve compatibility with the polyolefin. The selection of the molar ratio of the non-polar alpha-olefins to the polar ethylenically unsaturated carboxylic acids and/or to the polar ethylenically unsaturated carboxylic acid derivatives in the copolymer here is to be such that the copolymer adheres not only to the surface of the non-polar polyolefin molding but also to the surface of the polar POM molding. As described below, the adhesion can be affected not only by the formulation of the adhesion promoter but also by the manner of production. However, the ratio of polar to non-polar constituents in the molecule of the adhesion promoters used according to the invention has to be such as to permit production of composites with a bond strength of at least 0.2 N/mm$^2$ (measured in the tensile test at 23° C. by the method described at a later stage below).

It is impossible to predict with certainty the molar ratio of polar to non-polar monomers to be chosen in an individual case, and this has to be discovered in the individual case. This ratio is determined via a wide variety of parameters, e.g. the nature of the monomers forming the copolymer, the nature of the arrangement of the monomers in the copolymer, or the nature of the process for production of the composite.

The selection of the adhesion promoters to be used according to the invention is to be such that they lead to a bond strength of at least 0.2 N/mm$^2$, not only with respect to the POM but also with respect to the polyolefin, measured in the tensile test by the method described below.

The processing method used to achieve the composite with the adhesion promoter can play a part in achieving this bond strength. In order to achieve good bond strength, sufficient heat has to be introduced within the adhesion promoter during processing. Adherence to the appropriate sequence during processing is therefore another requirement. When the POM or the polyolefin is applied to the adhesion promoter, higher heat content of these materials can achieve higher bond strengths (cf. tables 1-3). The appropriate sequence during processing can therefore be decisive for the desired result, depending on the formulation of the adhesion promoter.

The formulation of the copolymers also determines the crystallinity and thus the heat resistance of the adhesion promoters. Particular preference is given here to the adhesion promoters which have higher melting points or Vicat softening points, for example above 50° C., in particular above 60° C., because of their heat resistance in the respective field of application.

For the purposes of this description, the term "copolymer" means any of the polymers which derive from at least two of the monomers described above.

These can therefore, by way of example, be co-, ter- or quaterpolymers. In accordance with the polymerization parameters, the co-components here may have been incorporated in random or alternating form, or in the form of blocks into the polymer, or may have been grafted onto a backbone.

The ethylenically unsaturated carboxylic acids used for copolymerization with alpha-olefins and/or for modification of polyolefins or of copolyolefins may comprise any desired carboxylic acids which have at least one ethylenically unsaturated group by way of which copolymerization and, respectively, modification can take place. Alongside monocarboxylic acids, di- or polycarboxylic acids can also be used.

Use may be made of any desired aliphatic or cycloaliphatic carboxylic acids, as long as these have at least one polymerizable double bond.

Typical examples of ethylenically unsaturated carboxylic acids are acrylic acid, methacrylic acid, itaconic acid, or maleic acid.

The ethylenically unsaturated carboxylic acid derivatives for copolymerization with alpha-olefins and/or for modification of polyolefins or of copolyolefins may comprise, instead of or together with ethylenically unsaturated carboxylic acids, the derivatives of the ethylenically unsaturated carboxylic acids described above, for example their esters, amides or anhydrides.

It is preferable to use the esters of these carboxylic acids, in particular the alkyl esters.

The term "ethylenically unsaturated carboxylic acid derivative" includes derivatives of saturated carboxylic acids which have at least one polymerizable double bond in the derivatized portion of the molecule. Examples of these are esters of saturated carboxylic acids which derive from an ethylenically unsaturated alcohol. Examples of these are vinyl acetate and vinyl butyrate.

Olefins which may be used for preparation of the adhesion promoters to be used according to the invention are the desired alpha-olefins or a combination of these.

It is also possible to use polyolefins, where these may be modified by co-components. Examples of these have previously been given at an earlier stage above in the description of the polyolefins forming the moldings.

The adhesion promoter to be used according to the invention is preferably a copolymer derived from an alpha-olefin, in particular from ethylene, and also from at least one ethylenically unsaturated carboxylic acid, and/or from at least one ethylenically unsaturated carboxylic acid derivative.

Particularly preferred copolymers of this type are ethylene copolymers with acrylic acid, methacrylic acid, acrylic ester, methacrylic ester, maleic anhydride, itaconic anhydride, or a combination of these as comonomer.

Another preferred group of copolymers is that of ethylene-vinyl ester copolymers, in particular ethylene-vinyl acetate copolymers.

Other preferred adhesion promoters are copolymers which are derived from at least one alpha-olefin and from at least one ethylenically unsaturated carboxylic acid, and/or from at least one ethylenically unsaturated carboxylic acid derivative, and which have been copolymerized/modified with at least one other ethylenically unsaturated carboxylic acid, and/or with at least one other ethylenically unsaturated carboxylic acid derivative.

Among the copolymers of this type are in particular ethylene-vinyl ester copolymers which have been modified with acrylic acid, with methacrylic acid, with acrylic ester, with methacrylic ester, with maleic anhydride, or with a combination of these, in particular ethylene-vinyl acetate copolymers which have been copolymerized/modified with acrylic ester and/or with methacrylic ester, and/or with maleic anhydride.

Each of these adhesion-promoting copolymers may be used individually or else in the form of a mixture of one or more components.

Particularly preferred adhesion-promoting polymers used according to the invention are selected from the following groups or a combination of these from one or more of these groups:

ethylene-vinyl acetate copolymers; products of this type are available with the name Levapren® (Bayer).
ethylene-vinyl acetate-maleic anhydride terpolymers; products of this type are available with the name Orevac® (Atofina).
ethylene-butyl acrylate copolymers; products of this type are available with the name Lotryl® (Atofina).
ethylene-ethyl acrylate copolymers; products of this type are available with the name Lotryl® (Atofina).
ethylene-methyl acrylate copolymers; products of this type are likewise available with the name Lotryl® (Atofina).
ethylene-glycidyl methacrylate copolymers; products of this type are available with the name Lotader® (Atofina).
ethylene-methyl acrylate-glycidyl methacrylate terpolymers; products of this type are available with the name Lotader® (Atofina).
ethylene-butyl acrylate-glycidyl methacrylate terpolymers modified with maleic anhydride; products of this type are available with the name Lotader® (Atofina).
ethylene-acrylate-maleic anhydride terpolymers; products of this type are available with the name Lotader® (Atofina).
ethylene-vinyl acetate modified with maleic anhydride; products of this type are available with the name Plexar® (Equistar).

The present invention therefore particularly preferably provides a composite comprising a POM molding and, bonded thereto via a layer composed of adhesion-promoting polymer, a polyolefin molding, where the adhesion-promoting polymer is selected from the group consisting of ethylene-vinyl esters or ethylene homopolymers grafted with ethylenically unsaturated carboxylic esters and/or with unsaturated carboxylic anhydrides, of ethylene-vinyl ester copolymers, in particular ethylene-vinyl acetate, and of ethylene-acrylic ester copolymers, ethylene-glycidyl methacrylate copolymers, and mixtures of these.

Very particularly preferred adhesion-promoting polymers are copolymers which derive from ethylene and vinyl acetate (EVA) or from ethylene and acrylic esters, in particular methyl acrylate, ethyl acrylate, propyl acrylate, butyl acrylate, or glycidyl methacrylate, and which have also, where appropriate, been modified with anhydrides of unsaturated carboxylic acids, in particular with maleic anhydride.

Because of their heat resistance, particular preference is given here to adhesion-promoting polymers with a relatively high melting point (measured via differential scanning calorimetry (DSC)) or Vicat softening point (ISO 306), for example above 50° C., in particular above 60° C.

For the purposes of this description, the term composite products means any desired composites, as long as these have at least the combination of polyacetal molding bonded to at least one polyolefin molding by way of a layer composed of the adhesion-promoting polymers defined above. The moldings may be any desired three-dimensional molded products, and these also include foils or films.

Preference is given to composite products which have at least three layers and which have at least one layer sequence as follows: polyacetal, adhesion-promoting layer, and polyolefin.

Other preferred inventive composite products have five layers and have a layer sequence as follows: polyacetal, adhesion-promoting layer, polyolefin, adhesion-promoting layer, and polyacetal, or have a layer sequence as follows: polyolefin, adhesion-promoting layer, polyacetal, adhesion-promoting layer, and polyolefin.

There are various ways of producing the inventive composite product.

Examples of possible production processes which clearly may be used for these composite products are multicomponent injection molding or coextrusion.

Another possibility available here is reprocessing of prefabricated POM components with polyolefins by blowing in extrusion blow molding.

In one embodiment, a molding is first molded from polyacetal, and then a layer of the specific adhesion-promoting polymer is applied thereto, for example by injection molding or by extrusion. A molding composed of polyolefin is then molded onto this combination, for example by injection molding or by extrusion.

In one further embodiment, a molding is first molded from polyolefin, and then a layer of the specific adhesion-promoting polymer is applied thereto, for example by injection molding or by extrusion. A molding composed of polyacetal is then molded onto this combination, for example by injection molding or by extrusion.

The inventive composite product here is therefore formed either via a polyacetal molding which has been coated to some extent or entirely with the specific adhesion-promoting polymer and the polyolefin, or onto which one or more moldings composed of polyolefin have been molded via use of the specific adhesion-promoting polymer, or is formed via a polyolefin molding which has been coated to some extent or entirely with the specific adhesion-promoting polymer and with the polyacetal, or onto which one or more moldings composed of polyacetals have been molded via use of the specific adhesion-promoting polymer.

The invention therefore also provides a process for producing the composite product defined above, encompassing the following measures:

a) producing a polyacetal molding from a polyacetal-containing molding composition in a manner known per se,
b) applying an adhesion-promoting layer comprising at least one of the polymers defined above to at least one surface of the polyacetal molding in a manner known per se, and
c) applying a polyolefin-containing molding composition to the adhesion-promoting layer produced in step b) so as to produce a composite of polyacetal molding and polyolefin molding.

The invention therefore also provides a process for producing the composite product defined above, encompassing the following measures:
a) producing a polyolefin molding from a polyolefin-containing molding composition in a manner known per se,
b) applying an adhesion-promoting layer comprising at least one of the polymers defined above to at least one surface of the polyolefin molding in a manner known per se, and
c) applying a polyacetal-containing molding composition to the adhesion-promoting layer produced in step b) so as to produce a composite of polyacetal molding and polyolefin molding.

The composite product is produced by well-known methods and processes.

Multicomponent injection molding (the insert process or conversion process) or coextrusion have been found to be particularly cost-effective and advantageous.

During production of the composites, it has been found that the adhesion achievable in an individual case for a given combination can also depend on the sequence of bonding steps. By way of example, if a polyacetal molding composition is injected onto a combination of polyolefin molding/adhesion-promoter layer, the achievable strengths of bond to the polyacetal are frequently higher, because of incipient melting of the adhesion promoter, than when the adhesion promoter is injected onto the polyacetal and then the polyolefin is injected onto the adhesion promoter. The formulation of the adhesion promoter and the sequence of the steps in the bonding process are therefore to be selected so as to permit achievement of a bond strength of at least 0.2 N/mm$^2$ by the test methods described above both with respect to the polyolefin and also with respect to the polyacetal.

The inventive composite products may be used in a very wide variety of engineering sectors.

Examples here are use as components of vehicles, in particular as components which come into contact with fuels.

However, the inventive composite products may be used not only in automotive construction, shipbuilding, and aircraft construction but also in industries which process fuel or process chemicals, or in fuel marketing, for example in gas stations, or refineries, or in chemical plants.

Examples of components in which the inventive composites may be used are fuel transport units, valves, tanks, or filler necks.

The inventive composite products are preferably used for POM valves which come into contact with fuels, e.g. for roll-over valves, for valves in and on the tank, or else for transport valves; or in the form of injection-molded, blown, or thermoformed fuel tanks (PE/adhesion promoter/POM), or else in the form of multilayer fuel-line connectors, or in the form of filler necks, in particular as POM overmolded with PE, or POM filler neck/PE ring molded-on by injection molding for subsequent bonding by way of heated-tool welding to the blow-molded multilayer HDPE filler pipe.

The inventive composite products are preferably used in the form of valves, in particular in the POM/PE composite, examples being ball-type stop valves composed of POM/PE composite (POM stop valve and PE casing, which can be welded to a pipeline).

Other preferred application sectors for the inventive composite products are application in the form of snap connectors, gearbox components, deflector rollers, gears, adjustment levers, pipes, and packaging.

Preferred application sectors are pipes, e.g. for pipelines for the temperature range up to 100° C. composed of POM/PE composite with POM inner wall (inner wall POM/adhesion promoter/outer wall HDPE), for pipelines or chemical plants, and packaging, such as canisters or bottles with good chemicals resistance (inner wall PE surrounded by adhesion promoter/POM).

The invention also provides the use of the composite products for these purposes.

The examples below illustrate the invention but do not restrict the same.

The test methods described below were used to ascertain the strength of bond between the polyacetal component and the specific adhesion promoters and, respectively, between the polyethylene component and the specific adhesion promoters, i.e. on composites composed of two materials.

The injection-molding experiments used a three-component injection-molding machine with a clamping-unit force of 2000 kN (FM 175/200, producer: Klöckner Ferromatik, Malterdingen, Germany). From the three screws available, a module with diameter 45 mm was used. First, halved ISO tensile specimens composed of polyacetal or of polyethylene or of the appropriate adhesion promoter were injection molded in advance under the conditions stated for the material in the tables in relation to melt temperature $T_m$ and mold temperature $T_w$, in a cavity half of which had been closed off.

For the insert experiments, the halved polyacetal tensile specimens injection-molded in advance were subsequently first preheated to 155° C. in an oven and then placed, while hot, in the completely open cavity, and then the adhesion promoter was applied by injection molding.

All of the parameters used here: melt temperatures ($T_m$), mold temperatures ($T_w$), holding pressures (Pa), hold-pressure times (tpa), and injection speeds (ve) for component 2 (adhesion promoter) are stated in the tables below.

The procedure using halved specimens composed of polyethylene was exactly the same except that the pre-heat temperature (insert temperature) here was only 90° C.

The experiments using the adhesion promoters as first component were carried out in exactly the same way except that these halved specimens were not pre-heated but inserted at room temperature into the mold which was temperature-controlled to 60° C. Polyacetal or polyethylene at their stated melt temperatures were then injected onto the adhesion promoters.

All of the adhesion promoters were dried directly prior to processing in order to reduce degradation due to moisture.

Given adequate adhesion, the result of the process described was a complete tensile specimen with a bonded joint between the two halved dumbbells composed of polyacetal or polyethylene and of the specific adhesion promoter.

These test specimens were tested in a Zwick (Ulm, Germany) 1455 tensile testing machine, using a separation velocity of 50 mm/min in the tensile test at 23° C. (ISO 527).

For each experiment, ten composite tensile specimens were injection-molded and tested. The result of the tensile test (tensile stress/tensile strain) was used to determine the tensile strength to break of the specimens at the bonded joint (bond strength) and the associated tensile strain at break. The values obtained for the ten test specimens were averaged, and the associated standard deviation was calculated. The results are given in the tables below.

The following adhesion-promoting polymers were studied in the examples:

Adhesion promoter 1 (AP1): Terpolymer based on ethylene-vinyl acetate and maleic anhydride (Orevac® 9318 (Atofina), melting point 85° C.)

Adhesion promoter 2 (AP2): Copolymer based on ethylene-butyl acrylate (Lotryl® 28 BA 175 (Atofina), melting point 80° C.)

Adhesion promoter 3 (AP3): Copolymer based on ethylene-methyl acrylate (Lotryl® 20 MA 08 (Atofina), melting point 80° C.)

Adhesion promoter 4 (AP4): Copolymer based on ethylene-glycidyl methacrylate (Lotader® 8840 (Atofina), melting point 109° C.)

Adhesion promoter 5 (AP5): Terpolymer based on ethylene, methyl acrylate, and glycidyl methacrylate (Lotader® 8900 (Atofina), melting point 65-73° C.)

Adhesion promoter 6 (AP6): Terpolymer based on ethylene, butyl acrylate, and maleic anhydride (Lotader®) 3410 (Atofina), melting point 95° C.)

Adhesion promoter 7 (AP7): Copolymer based on ethylene-vinyl acetate modified with maleic anhydride (Plexar® PX 107 (Equistar), Vicat point 90° C.)

Adhesion promoter 8 (AP8): Copolymer based on ethylene-vinyl acetate modified with maleic anhydride (Plexar® PX 108 (Equistar), Vicat point 90° C.)

Adhesion promoter 9 (AP9): Copolymer based on ethylene-vinyl acetate modified with maleic anhydride (Plexar® PX 114 (Equistar), Vicat point 81° C.)

Adhesion promoter 10 (AP10): Copolymer based on ethylene-vinyl acetate modified with maleic anhydride (Plexar® PX 1164 (Equistar), Vicat point 58° C.)

Adhesion promoter 11 (AP11): Copolymer based on ethylene-vinyl acetate (Levapren® KA 8479 (Bayer))

A HDPE (Hostalen® GM 7745) suitable for use in fuel tanks was used for the two-component injection-molding experiments.

A commercially available polyacetal copolymer composed of trioxane and about 2% by weight of ethylene oxide with a melt index MVR 190/2.16 (to ISO 1133) of 8 cm$^3$/10 min (Hostaform® C 9021) was used for the two-component injection-molding experiments.

The following tables show how the individual experiments were carried out and how the mechanical data were ascertained for the resultant two-component composite products.

TABLE 1

Tests with polyethylene ("PE") as first component and adhesion promoter as component applied by injection molding

| Experiment No. | 1$^{st}$ comp. | $T_m$, $T_w$, 1$^{st}$ c. (° C.) | 2$^{nd}$ comp. | $T_m$, $T_w$, second comp. (° C.) | $p_a$, tpa, second comp. (bar), (sec) | $V_e$, second comp. (%) | Bond strength (N/mm$^2$) | Tensile strain at break (%) |
|---|---|---|---|---|---|---|---|---|
| 1 | PE | 200,60 | AP11 | 200,40 | 50,30 | 50 | No adhesion | No adhesion |
| 2 | PE | 200,60 | AP11 | 220,40 | 50,30 | 50 | No adhesion | No adhesion |
| 3 | PE | 200,60 | AP1 | 200,40 | 45,15 | 50 | 3.8 | 10.8 |
| 4 | PE | 200,60 | AP1 | 220,40 | 45,15 | 50 | 4.0 | 12.6 |
| 5 | PE | 200,60 | AP1 | 240,40 | 45,15 | 50 | 4.1 | 16.0 |
| 6 | PE | 200,60 | AP2 | 200,40 | 35,35 | 50 | 1.7 | 9.7 |
| 7 | PE | 200,60 | AP2 | 220,40 | 35,35 | 50 | 1.9 | 14.0 |
| 8 | PE | 200,60 | AP2 | 240,40 | 35,35 | 50 | 1.8 | 14.2 |
| 9 | PE | 200,60 | AP3 | 200,40 | 35,35 | 50 | 2.8 | 9.6 |
| 10 | PE | 200,60 | AP3 | 220,40 | 35,35 | 50 | 2.8 | 9.6 |
| 11 | PE | 200,60 | AP3 | 240,40 | 35,35 | 50 | 2.8 | 10.3 |
| 12 | PE | 200,60 | AP4 | 200,40 | 45,15 | 50 | 4.9 | 3.6 |
| 13 | PE | 200,60 | AP4 | 220,40 | 45,15 | 50 | 4.9 | 4.0 |
| 14 | PE | 200,60 | AP4 | 240,40 | 45,15 | 50 | 5.3 | 5.0 |
| 15 | PE | 200,60 | AP6 | 200,40 | 45,15 | 50 | 3.2 | 11.6 |
| 16 | PE | 200,60 | AP6 | 220,40 | 45,15 | 50 | 3.4 | 13.5 |
| 17 | PE | 200,60 | AP6 | 240,40 | 45,15 | 50 | 3.4 | 18.6 |
| 18 | PE | 200,60 | AP5 | 200,40 | 45,25 | 50 | 1.7 | 14.4 |
| 19 | PE | 200,60 | AP5 | 220,40 | 45,30 | 50 | 1.4 | 11.9 |
| 20 | PE | 200,60 | AP5 | 240,40 | 45,30 | 50 | 1.6 | 14.2 |
| 21 | PE | 200,60 | AP9 | 200,40 | 40,15 | 50 | 5.7 | 6.0 |
| 22 | PE | 200,60 | AP9 | 220,40 | 40,15 | 50 | 3.7 | 6.1 |
| 23 | PE | 200,60 | AP9 | 240,40 | 40,15 | 50 | 5.4 | 6.0 |

TABLE 2

Tests with polyacetal ("POM") as first component and adhesion promoter as component applied by injection molding

| Experiment No. | 1st comp. | $T_m$, $T_w$, 1st c. (°C.) | 2nd comp. | $T_m$, $T_w$, second comp. (°C.) | $p_a$, tpa, second comp. (bar), (sec) | $V_e$, second comp. (%) | Bond strength (N/mm²) | Tensile strain at break (%) |
|---|---|---|---|---|---|---|---|---|
| 24 | POM | 200,80 | AP11 | 200,40 | 50,30 | 50 | 0.5 | 41.7 |
| 25 | POM | 200,80 | AP11 | 220,40 | 50,30 | 50 | 0.5 | 85.0 |
| 26 | POM | 200,80 | AP1 | 200,40 | 45,15 | 50 | No adhesion | No adhesion |
| 27 | POM | 200,80 | AP1 | 220,40 | 45,15 | 50 | No adhesion | No adhesion |
| 28 | POM | 200,80 | AP1 | 240,40 | 45,15 | 50 | No adhesion | No adhesion |
| 29 | POM | 200,80 | AP2 | 200,40 | 35,35 | 50 | 0.3 | 0.9 |
| 30 | POM | 200,80 | AP2 | 220,40 | 35,35 | 50 | 0.9 | 2.8 |
| 31 | POM | 200,80 | AP2 | 240,40 | 35,35 | 50 | 0.5 | 1.6 |
| 32 | POM | 200,80 | AP3 | 200,40 | 35,35 | 50 | No adhesion | No adhesion |
| 33 | POM | 200,80 | AP3 | 220,40 | 35,35 | 50 | No adhesion | No adhesion |
| 34 | POM | 200,80 | AP3 | 240,40 | 35,35 | 50 | No adhesion | No adhesion |
| 35 | POM | 200,80 | AP4 | 200,40 | 45,15 | 50 | No adhesion | No adhesion |
| 36 | POM | 200,80 | AP4 | 220,40 | 45,15 | 50 | No adhesion | No adhesion |
| 37 | POM | 200,80 | AP4 | 240,40 | 45,15 | 50 | No adhesion | No adhesion |
| 38 | POM | 200,80 | AP6 | 200,40 | 45,15 | 50 | No adhesion | No adhesion |
| 39 | POM | 200,80 | AP6 | 220,40 | 45,15 | 50 | No adhesion | No adhesion |
| 40 | POM | 200,80 | AP6 | 240,40 | 45,15 | 50 | No adhesion | No adhesion |
| 41 | POM | 200,80 | AP5 | 200,40 | 45,25 | 50 | 0.3 | 1.5 |
| 42 | POM | 200,80 | AP5 | 220,40 | 45,30 | 50 | 0.4 | 1.9 |
| 43 | POM | 200,80 | AP5 | 240,40 | 45,30 | 50 | 0.4 | 2.2 |
| 44 | POM | 200,80 | AP9 | 200,40 | 40,15 | 50 | 2.9 | 1.1 |
| 45 | POM | 200,80 | AP9 | 220,40 | 40,15 | 50 | 2.5 | 0.9 |
| 46 | POM | 200,80 | AP9 | 240,40 | 40,15 | 50 | 1.9 | 0.7 |
| 47 | POM | 200,80 | AP8 | 200,40 | 40,15 | 50 | 1.8 | 0.4 |
| 48 | POM | 200,80 | AP8 | 220,40 | 40,15 | 50 | 2.1 | 0.5 |
| 49 | POM | 200,80 | AP8 | 240,40 | 40,15 | 50 | 1.6 | 0.4 |
| 50 | POM | 200,80 | AP7 | 200,40 | 40,15 | 50 | No adhesion | No adhesion |
| 51 | POM | 200,80 | AP7 | 220,40 | 40,15 | 50 | No adhesion | No adhesion |
| 52 | POM | 200,80 | AP7 | 240,40 | 40,15 | 50 | No adhesion | No adhesion |
| 53 | POM | 200,80 | AP10 | 200,40 | 40,15 | 50 | 1.2 | 1.4 |
| 54 | POM | 200,80 | AP10 | 220,40 | 40,15 | 50 | 1.8 | 2.3 |
| 55 | POM | 200,80 | AP10 | 240,40 | 40,15 | 50 | 2.0 | 2.7 |

TABLE 3

Tests with adhesion promoter as first component and polyacetal ("POM") or polyethylene ("PE") as component applied by injection molding

| Experiment No. | 1st comp. | $T_m$, $T_w$, 1st c. (°C.) | 2nd comp. | $T_m$, $T_w$, second comp. (°C.) | $p_a$, tpa, second comp. (bar), (sec) | $V_e$, second comp. (%) | Bond strength (N/mm²) | Tensile strain at break (%) |
|---|---|---|---|---|---|---|---|---|
| 56 | AP1 | 200,40 | PE | 250,60 | 50–70,30 | 50 | 6.5 | 144.0 |
| 57 | AP2 | 200,40 | PE | 250,60 | 50–70,30 | 50 | 1.9 | 36.7 |
| 58 | AP3 | 200,40 | PE | 250,60 | 50–70,30 | 50 | 5.0 | 100.3 |
| 59 | AP4 | 200,40 | PE | 250,60 | 50–70,30 | 50 | 8.3 | 67.9 |
| 60 | AP6 | 200,40 | PE | 250,60 | 50–70,30 | 50 | 4.7 | 64.2 |
| 61 | AP5 | 200,40 | PE | 250,60 | 50–70,30 | 50 | 2.6 | 49.1 |
| 62 | AP9 | 200,40 | PE | 250,60 | 50–70,30 | 50 | 8.9 | 72.2 |
| 63 | AP1 | 200,40 | POM | 250,60 | 50–70,30 | 50 | 3.4 | 7.4 |

TABLE 3-continued

Tests with adhesion promoter as first component and polyacetal ("POM") or polyethylene ("PE") as component applied by injection molding

| Experiment No. | 1st comp. | $T_m, T_w,$ 1st c. (° C.) | 2nd comp. | $T_m, T_w,$ second comp. (° C.) | $p_a$, tpa, second comp. (bar), (sec) | $V_e$, second comp. (%) | Bond strength (N/mm²) | Tensile strain at break (%) |
|---|---|---|---|---|---|---|---|---|
| 64 | AP2 | 200,40 | POM | 250,60 | 50–70,30 | 50 | 2.2 | 64.5 |
| 65 | AP3 | 200,40 | POM | 250,60 | 50–70,30 | 50 | 2.7 | 9.6 |
| 66 | AP4 | 200,40 | POM | 250,60 | 50–70,30 | 50 | No adhesion | No adhesion |
| 67 | AP6 | 200,40 | POM | 250,60 | 50–70,30 | 50 | 1.5 | 2.6 |
| 68 | AP5 | 200,40 | POM | 250,60 | 50–70,30 | 50 | 1.3 | 11.2 |
| 69 | AP9 | 200,40 | POM | 250,60 | 50–70,30 | 50 | No adhesion | No adhesion |

On the basis of the results listed in the tables for the adhesion tests, the following examples of the inventive composite products, inter alia, can be produced via multicomponent injection molding.

TABLE 4

| Example No. | First component | Second component (adhesion promoter) | Third component |
|---|---|---|---|
| 1 | PE | AP1 | POM |
| 2 | PE | AP2 | POM |
| 3 | PE | AP3 | POM |
| 4 | PE | AP6 | POM |
| 5 | PE | AP5 | POM |
| 6 | POM | AP2 | PE |
| 7 | POM | AP5 | PE |
| 8 | POM | AP9 | PE |
| 9 | POM | AP8 | PE |
| 10 | POM | AP10 | PE |

The invention claimed is:

1. A composite product encompassing at least one polyacetal molding and at least one polyolefin molding, which have been bonded at least one of their surfaces using an adhesion-promoting layer which is substantially composed of a copolymer or of a mixture of these which derives from at least one alpha-olefin, from at least one ethylenically unsaturated carboxylic ester and, optionally from at least one other ethylenically unsaturated carboxylic acid derivative, where the molar ratio of alpha-olefin to ethylenically unsaturated carboxylic ester and, optionally other ethylenically unsaturated carboxylic acid derivative is selected so as to obtain the composite with a bond strength (measured by the tensile test at 23° C.) of at least 0.2 N/mm² and wherein the composite has five layers and has the following layer sequence: polyacetal, adhesion-promoting layer, polyolefin, adhesion-promoting layer, and polyacetal, or polyolefin, adhesion-promoting layer, polyacetal, adhesion-promoting layer, and polyolefin.

2. The composite product as claimed in claim 1, wherein the composite has a bond strength (measured by the tensile test at 23° C.) of at least 0.5 N/mm².

3. The composite product as claimed in claim 1, wherein the polyacetal molding is a molding comprising polyoxymethylene homo- or copolymer.

4. The composite product as claimed in claim 1, wherein the polyolefin molding is a molding comprising polyethylene.

5. The composite product as claimed in claim 1, wherein the adhesion promoters used comprise copolymers derived from an alpha-olefin and from at least one ethylenically unsaturated carboxylic ester and from at least one other ethylenically unsaturated carboxylic acid derivative.

6. The composite product as claimed in claim 5, wherein the alpha-olefin is ethylene, copolymerized with acrylic ester, with methacrylic ester, or with a combination of these.

7. The composite product as claimed in claim 1, wherein the adhesion promoters used comprise ethylene-vinyl ester copolymers.

8. The composite product as claimed in claim 1, wherein the adhesion promoters used comprise a copolymer derived from at least one alpha-olefin and from at least one ethylenically unsaturated carboxylic ester modified with at least one further ethylenically unsaturated carboxylic acid derivative.

9. The composite product as claimed in claim 8, wherein the adhesion promoters used comprise an ethylene-vinyl ester copolymer copolymerized/modified with acrylic ester, with methacrylic ester, with itaconic anhydride, with maleic anhydride, or with a combination of these, in particular comprise an ethylene-vinyl acetate copolymer copolymerized/modified with acrylic and/or methacrylic ester.

10. The composite product as claimed in claim 1, wherein the adhesion promoters used comprise copolymers which derive from ethylene and vinyl acetate (EVA) or from ethylene and acrylic esters, and which optionally have also been copolymerized/modified with anhydrides of unsaturated carboxylic acids.

11. The composite product as claimed in claim 1, wherein the adhesion promoters used comprise a copolymer from the group consisting of ethylene-vinyl acetate-maleic anhydride terpolymer, ethylene-butyl acrylate copolymer, ethylene-ethyl acrylate copolymer, ethylene-methyl acrylate copolymer, ethylene-glycidyl methacrylate copolymer, ethylene-methyl acrylate-glycidyl methacrylate terpolymer, ethylene-ethyl acrylate-glycidyl methacrylate terpolymer, ethylene-butyl acrylate-glycidyl methacrylate terpolymer, ethylene-methyl acrylate-maleic anhydride terpolymer, ethylene-ethyl acrylate-maleic anhydride terpolymer, ethylene-butyl acrylate-maleic anhydride terpolymer, and ethylene vinyl acetate modified with maleic anhydride.

12. The composite product as claimed in claim 1, wherein the adhesion-promoting copolymers used have a melting point or a Vicat softening point above 50° C.

13. The composite product as claimed in claim 1, wherein the polyacetal molding is a molding comprising a copolymer containing repeat units of polyoxymethylene and of polyoxyethylene and/or of polyoxybutylene.

14. The composite product as claimed in claim 1, wherein the adhesion promoters used comprise ethylene-vinyl acetate copolymers.

15. The composite product as claimed in claim 1, wherein the adhesion promoters used comprise copolymers which derive from ethylene and vinyl acetate (EVA) or from ethylene and acrylic esters selected from the group consisting of methyl acrylate, ethyl acrylate, propyl acrylate, or butyl acrylate, and which have optionally been copolymerized/modified with maleic anhydride.

16. A component which come into contact with fuel which comprises the composite product as claimed in claim 1.

17. A snap connector, power train component, deflector roll, gear wheel, shift lever, tube or packaging material which comprise the composite products as claimed in claim 1.

* * * * *